Patented May 26, 1925.

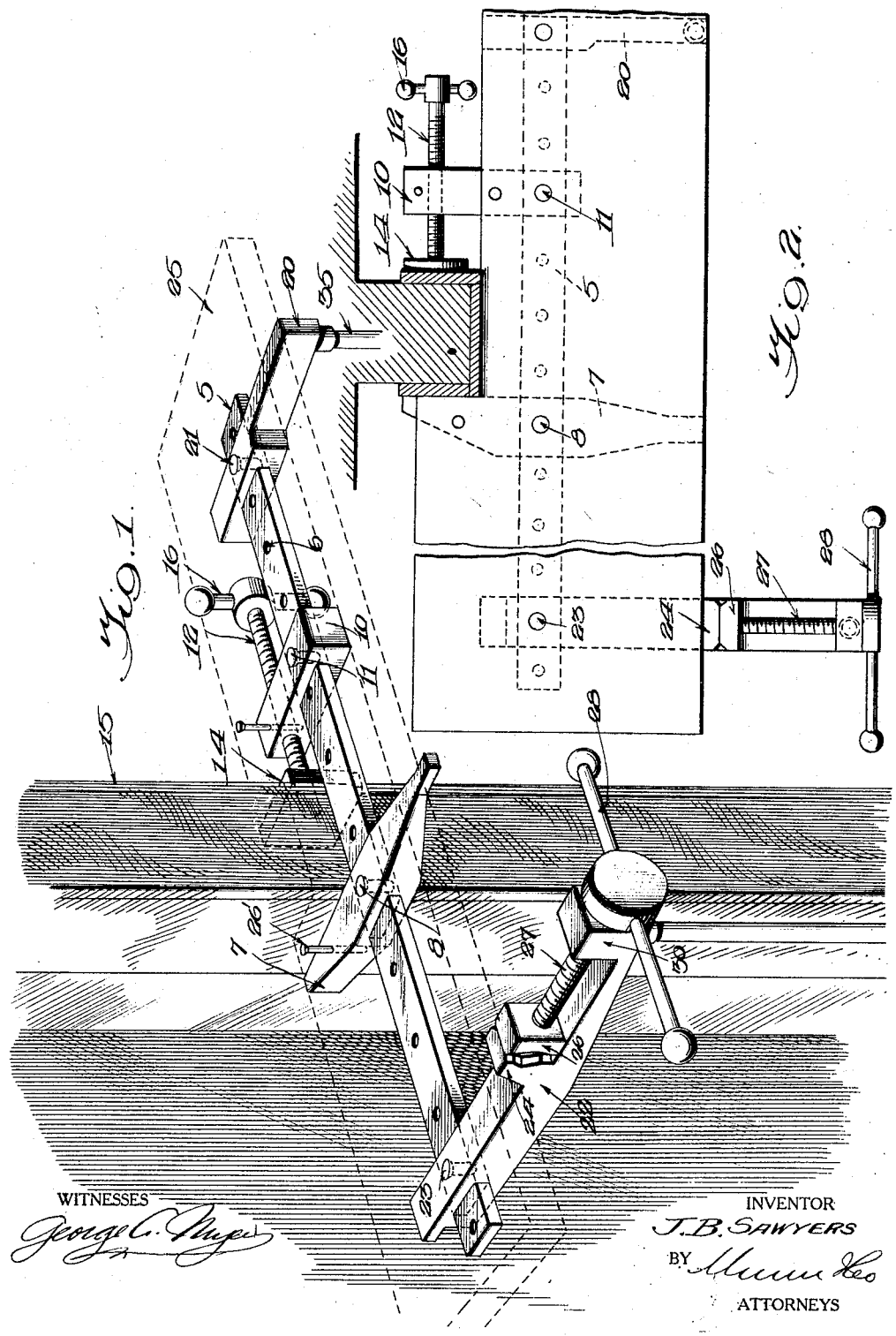

1,539,059

UNITED STATES PATENT OFFICE.

JOHN B. SAWYERS, OF GAINESVILLE, TEXAS.

WORKBENCH.

Application filed June 20, 1924. Serial No. 721,255.

*To all whom it may concern:*

Be it known that I, JOHN B. SAWYERS, a citizen of the United States, residing at Gainesville, in the county of Cooke, State of Texas, have invented certain new and useful Improvements in Workbenches, of which the following is a specification.

This invention relates to portable work benches especially adapted for use by carpenters, plumbers, joiners, and other mechanics.

Briefly stated, an important object of this invention is to provide a portable work bench which may be secured to any projection within reasonable limits and held in an operative position without marring the appearance of the projection to which it is attached and without inconvenience on the part of the operator.

Other objects and advantages will be apparent during the course of the following description.

In the accompanying drawing forming a part of this application and in which like numerals are employed to designate corresponding parts throughout the several views, Figure 1 is a perspective of the improved portable work bench, and Figure 2 is a fragmentary plan view of the same.

In the drawing, wherein for the purpose of illustration is shown a preferred embodiment of the invention, the numeral 5 designates a suitably stout bar having a series of apertures 6 for the reception of fastening pins to be described.

With reference to Figure 1 it will be observed that a jaw 7 is provided intermediate the ends thereof with an opening receiving the bar 6 and a pin 8 may be extended through the jaw 7 and one of the openings 6 so as to securely hold the jaw in a fixed position. An arm 10 is also mounted on the bar 5 and is provided with a pin 11 by means of which the arm may be adjustably secured to the bar 5. The outer portion of the arm 10 is provided with a feed screw 12 having its forward end provided with a disc-shaped jaw 14 adapted to co-operate with the jaw 7 in engaging a door jamb 15 or any other convenient projection. The feed screw 12 is, of course, threaded through one end portion of the arm 10 and when the feed screw is advanced the head is urged flatly into engagement with the object 15 which may be a projection of any nature. Of course, the disc-shaped head 14 is swivelled on the feed screw 12 so that the head will not be turned when the feed screw is advanced. The rear portion of the feed screw 12 is provided with a handle 16 by means of which the feed screw may be operated.

One end of the bar 5 may be provided with a supporting member 20 secured in an adjusted position on the bar by means of a pin 21. The pin 21 may be extended through any one of the openings 6 and, therefore, holds the supporting member 20 in an adjusted position on the bar 5.

The other end of the bar 5 carries a second supporting member 22 held in an adjusted position by means of a pin 23 and it will be seen that the plank or other work support 25 may be mounted on the transverse supporting members 20 and 22 and will rest against the projection 15 and against a transverse shoulder or projection 24 on the upper side of the member 20. Also fastening members 26' of any suitable type may be employed to connect the work supporting plank to the members 7 and 10 or to any other convenient part of the framework.

In carrying out the invention the projection 24 on the upper side of the transversely extending member 22 forms a stationary jaw which co-operates with a movable jaw 26. The movable jaw 26 is movable on the upper surface of the member 22 and is controlled by means of a feed screw 27. A handle 28 is connected to the rear end of the feed screw 27 and forms a means whereby the movable jaw 26 may be adjusted. The feed screw is threaded through a projection 30 on the terminal portion of the transversely extending member 22. With reference to Fig. 1 it will be seen that the jaws 24 and 26 cooperate in the formation of a vise adapted for engaging pipe, wood, or any other material.

Suitable legs 35 may be employed to support the frame work and in this respect effectively cooperate with the members 7 and 14.

With reference to the foregoing description taken in connection with the accompanying drawing it will be seen that the improved portable work bench may be applied to any convenient projection either in a house or a work shop or in the open without marring the appearance of the projection to which it is connected and without inconvenience or the exercise of unusual skill.

Having thus described the invention what I claim is:

1. A portable work bench comprising a main bar, a jaw adjustably secured on the main bar, an arm adjustably secured to said bar and having a threaded opening, a feed screw threaded through said opening and having a swivelly mounted head adapted to co-operate with said jaw in engaging a projection, supporting members mounted on said bar adjacent the ends of the same, and a work-supporting plank mounted on said supporting members.

2. A portable work bench comprising a main bar, a jaw adjustably secured on the main bar and projecting from opposite sides of the same, an arm adjustably secured to said bar and having a threaded opening, a feed screw threaded through said opening and having a swivelly mounted head adapted to co-operate with said jaw in engaging a projection, supporting members mounted on said bar adjacent the ends of the same, a work-supporting plank mounted on said supporting members, and means to secure said plank on said supporting members.

3. A portable work bench comprising a main bar, a jaw adjustably secured on the main bar and projecting from opposite sides of the same, an arm adjustably secured to said bar and having a threaded opening, a feed screw threaded through said opening and having a swivelly mounted head adapted to co-operate with said jaw in engaging a projection, supporting members mounted on said bar adjacent the ends of the same, a work-supporting plank mounted on said supporting members, means to secure said plank to said supporting members, and legs co-operating with said jaws in supporting the bench.

4. A portable work bench comprising a main bar, a jaw adjustably secured on the main bar and projecting from opposite sides of the same, an arm adjustably secured to said bar and having a threaded opening, a feed screw threaded through said opening and having a swivelly mounted head adapted to co-operate with said jaw in engaging a projection, transversely extending supporting members mounted on said bar adjacent the ends of the same, a work-supporting plank mounted on said transversely extending members, means to secure said plank on said transversely extending members, legs co-operating with said jaws in supporting the bench, one of said transversely extending members being provided with an upstanding combined shoulder and jaw, a second jaw mounted on said transversely extending member adjacent said combined shoulder and jaw, and a second feed screw connected to said second-named jaw for positioning the same.

5. A portable work bench comprising a main bar, a jaw adjustably secured on the main bar and projecting from opposite sides of the same, an arm adjustably secured to said bar and having a threaded opening, a feed screw threaded through said opening and having a swivelly mounted head adapted to co-operate with said jaw in engaging a projection, transversely extending supporting members mounted on said bar adjacent the ends of the same, a work-supporting plank mounted on said transversely extending members, means to secure said plank on said transversely extending members, legs co-operating with said jaws in supporting the bench, one of said transversely extending members being provided with an upstanding combined shoulder and jaw, a second jaw mounted on said transversely extending member adjacent said combined shoulder and jaw, a second feed screw connected to said second-named jaw for positioning the same, one edge of said plank being engaged with said combined shoulder and jaw.

JOHN B. SAWYERS.